United States Patent [19]
Garrett

[11] 3,715,752
[45] Feb. 6, 1973

[54] STRUCTURE FOR AND METHOD OF AIRCRAFT GUIDANCE

[75] Inventor: Patrick H. Garrett, Athens, Ohio

[73] Assignee: The President and Board of Trustees of Ohio University, Athens, Ohio

[22] Filed: Jan. 26, 1970

[21] Appl. No.: 5,771

[52] U.S. Cl............343/7.3, 235/150.26, 343/5 LS, 343/108 R
[51] Int. Cl................................................G01s 9/14
[58] Field of Search.................343/7.3, 108 R, 5 LS; 235/150.26

[56] References Cited

UNITED STATES PATENTS

| | | | |
|---|---|---|---|
| 3,644,722 | 2/1972 | Hobbs et al.............. | 343/108 R |
| 3,398,267 | 8/1968 | Hattendorf............... | 343/108 X |
| 3,519,806 | 7/1970 | Lami et al................ | 343/108 X |
| 3,165,745 | 1/1965 | Pike et al.................. | 343/108 |

Primary Examiner—T. H. Tubbesing
Attorney—Whittemore, Hulbert & Belknap

[57] ABSTRACT

A vertical guidance system for providing a glide-path for aircraft. An aircraft slant-range signal from a known distance-measuring equipment interrogator is divided by an aircraft altitude signal from known altitude-measuring equipment to provide a true aircraft glide angle, and the true aircraft glide angle is subtracted from a reference aircraft glide angle which determines a reference glidepath to provide an aircraft glide angle error signal in degrees. The glide angle error signal is then multiplied by the slant-range signal to provide a vertical lineal distance error indication of the position of the aircraft relative to the reference glidepath. Structure is also disclosed for electronically compensating for offsetting the usual distance-measuring equipment from a desired aircraft touchdown point. The altitude signal is compensated for variations in field altitude and barometric pressures and in one modification may be synchronized with the pilot's altimeter. Aircraft arrival at a letdown-initiation point is visually indicated by the disclosed guidance system.

14 Claims, 9 Drawing Figures

INVENTOR.
PATRICK H. GARRETT

ATTORNEYS

INVENTOR.
PATRICK H. GARRETT
BY Whittemore
Hulbert & Belknap
ATTORNEYS

STRUCTURE FOR AND METHOD OF AIRCRAFT GUIDANCE

BACKGROUND OF THE INVENTION

1. Field of the Invention

The invention relates to aircraft glidepath indicating apparatus and refers more specifically to vertical guidance structure which may be used in either descending to a predetermined point or ascending from the predetermined point along a select relatively steep glidepath in accordance with noise-abatement policies, which guidance structure includes a specific solid-state electronic circuit minimized to the extent possible while providing optimum performance within acceptable cost requirements and which guidance structure realizes a maximum repeatable accuracy in addition to being simple, economical and efficient.

DESCRIPTION OF THE PRIOR ART

In the past, aircraft guidance systems such as the ILS and GCA systems have been known. These prior systems, however, require especially equipped aircraft or highly trained personnel and expensive equipment for proper functioning or are limited to a predetermined glide angle of, for example, 2°, or are not efficient in bringing aircraft from a cruising altitude down to an altitude where a final landing approach glidepath is required, or are incapable of directing an aircraft to a cruising altitude along a selected glidepath.

In addition, a plurality of ground-installed radio devices for emitting electronic energy to provide varied information to aircraft in flight such as visual omnirange structure, tactical air navigation structure, distance-measuring equipment, marker beacons, radio compass locators, and localizer transmitters have been known in the past. Such structures, however, are not in themselves or in any obvious combination capable of providing an aircraft glidepath suitable for letting an aircraft down from a cruising altitude or directing a plane up to a cruising altitude in poor visibility.

Similarly, specialized equipment for providing a glidepath for vertical takeoff and landing aircraft, for carrier landings and the like have been provided in the past. Such structures have, however, been relatively complicated and have not been suitable for general-purpose use with aircraft having a minimum of specialized equipment.

SUMMARY OF THE INVENTION

In accordance with the invention, a conventional distance-measuring equipment interrogator is used to produce a signal in an aircraft representing the true slant-range distance of the aircraft from a predetermined touchdown point, an electric altimeter using a precision pressure transducer is used to provide a signal representing the true altitude of the aircraft, the distance signal is divided into the altitude signal in an electronic dividing circuit to provide a true glidepath angle signal, a reference glidepath angle signal is provided and the true glidepath signal is subtracted from the reference glidepath signal in a subtracting circuit to provide a glidepath angle error signal which is displayed on a meter in the aircraft.

The glidepath angle error signal is then multiplied by the distance signal in a multiplying circuit to provide a lineal vertical distance error signal indicating the vertical distance the aircraft is from the reference glidepath, which is also displayed on a meter in the aircraft. The lineal glidepath deviation is also intended for use as a derived air-data input for autopilots on other automatic landing systems. Means for testing the displayed error signals at the worst possible position; that is, at the aircraft touchdown point, is also provided in accordance with the invention along with structure for automatically visually indicating the arrival of the aircraft at the letdown-initiation point on the glidepath.

In addition, structure is provided in conjunction with the known means for providing a distance signal and the altitude signal for offsetting the equipment providing the distance signal from the touchdown point and for compensating the altitude signal for the altitude of a landing field and the barometric pressure. In a simplified embodiment of the vertical guidance system of the invention for providing an aircraft glide angle error signal in degrees, the barometric altitude signal is offset by synchronizing the altitude signal with the pilot's altimeter.

DESCRIPTION OF THE PREFERRED EMBODIMENTS

In providing glidepath information in accordance with the invention, slant-range distance information from a conventional distance-measuring interrogator and altitude information from an electric altimeter provided with a precision pressure transducer is made use of. This information relative to the position of an aircraft from a predetermined point on an airfield will yield the hypotenuse and altitude of a right triangle, as indicated in FIG. 2 of the drawings.

Figure 2:
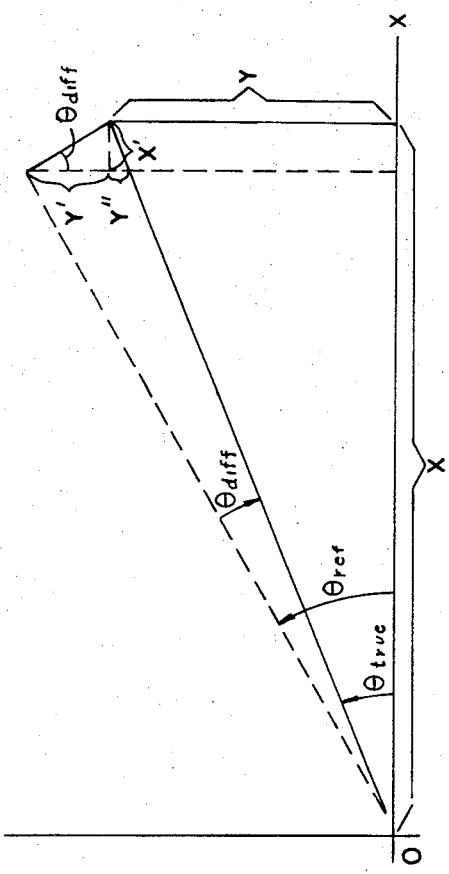
FIG. 2 is a diagram useful in explaining the structure illustrated in FIG. 1.

The altitude of the right triangle is designated Y in FIG. 2, while the base of the triangle is designated X. The predetermined point is designated O and is shown as the intersection of a horizontal X and a vertical Y axes.

The slant-range distance between the true position of the aircraft at point X, Y in FIG. 2 and the point O may be divided by the true altitude Y of the aircraft to provide a true glide angle $\theta_{true}$ between the aircraft and the point O. A similar reference glide angle, $\theta$ ref., may also be determined by assuming a reference slant-range distance and altitude as illustrated by the dotted lines in FIG. 2. The altitude difference Y' and the ground difference X' between the true position of the aircraft X, Y and the reference position of the aircraft, X−X', Y+Y', permit the construction of a reference right triangle having the altitude X' and the base Y'. The difference angle, $\theta$ diff., between the $\theta_{true}$ and $\theta_{ref.}$ can then be calculated along with the altitude difference Y'.

Remembering that the sine of an angle in radians and the angle for small angles are substantially equal, it will be seen that the angular deviation of the true position of an aircraft from a reference glidepath for the aircraft may be found by subtracting the reference glidepath angle, $\theta_{ref.}$, from the true glidepath angle, $\theta_{true}$. Further, it will be readily understood that the vertical distance of the aircraft from the reference glidepath may then be determined by multiplying the difference angle, $\theta_{diff.}$, by the true slant-range distance.

The vertical distance error value will be in error by an amount Y'' illustrated in FIG. 2. However, for glidepath angles of, for example, 6°, the error Y'' will be insignificant. The sign of the difference angle, $\theta_{diff.}$, and the vertical distance error will indicate whether the true position of the aircraft is above or below the reference glidepath.

The provision of an efficient profile flight guidance system then resolves itself into implementing the following equations wherein all angles are in radians and other dimensions are in consistent units:

altitude/slant-range distance $= \sin \theta_{true} \approx \theta_{true}$     (1)

$\theta_{true} - \theta_{ref.} = \pm \theta_{diff.} \approx \pm \sin \theta_{diff.}$     (2)

$(\pm \sin \theta_{diff.})$ (slant-range distance) $= \pm$ lineal deviation     (3)

Figure 1:
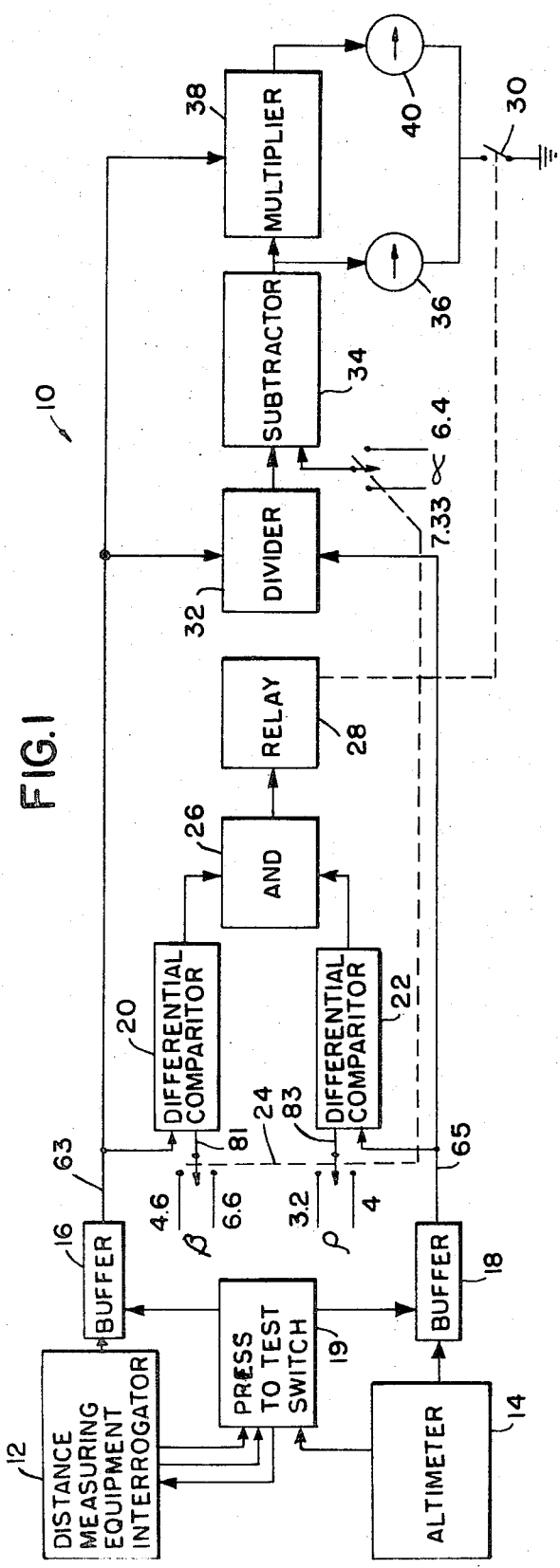
FIG. 1 is a block diagram of aircraft guidance structure for providing a display of glidepath angle error and vertical distance error from a reference glidepath constructed in accordance with the invention for effecting the method of the invention.

In accordance with the invention, the aircraft guidance circuit 10 of FIG. 1 is provided to implement these equations. In the circuit 10, a true slant-range distance electric signal which is compensated for offsetting of distance-measuring equipment from the point O is provided from a known distance-measuring equipment interrogator 12. A true altitude electric signal is provided from an electric altimeter 14 mechanized from a precision pressure transducer and including compensating structure for the actual altitude of the point O and the barometric pressure.

The true distance signal is buffered through the buffer 16 and the true altitude signal is buffered through buffer 18. A press-to-test switch 19 is provided in conjunction with the distance-measuring equipment interrogator 12 and altimeter 14 to insure proper calibration of the aircraft guidance circuit 10 at the O position on the glidepath.

The true slant-range distance signal from buffer 16 is compared with a reference slant-range distance signal $\beta$ in the differential comparator 20, while the true altitude signal from the buffer 18 is compared with a reference altitude signal $\rho$ in the differential comparator 22. The reference slant-range distance signal may be selected from a plurality of different signals $\beta$, and the reference altitude signal $\rho$ is accordingly selected from a plurality of different altitude signals $\rho$ on actuation of the ganged switch 24. Switch 24 also provides a reference angle signal $\alpha$ in accordance with the selected slant-range and altitude signals $\beta$ and $\rho$ for a purpose to be considered subsequently.

When the reference slant-range distance signal becomes greater than the true slant-range distance signal from the buffer 16, the differential comparator 20 provides an output signal to the AND gate 26. Similarly, when the reference altitude signal becomes greater than the true altitude signal from the buffer 18 in comparator 22, an output signal is provided from the comparator 22 to the AND gate 26.

The relay circuit 28 is energized when the AND gate 26 receives a signal from both the differential comparators 20 and 22. Relay 28 is operable to close switch 30 on being energized.

The true slant-range distance signal from the buffer 16 is provided the divider 32 along with the true altitude signal from the buffer 18. Divider 18 thus provides a $\theta_{true}$ or true glidepath angle signal to the subtractor 34.

The subtractor 34 receives the true glidepath angle signal from the divider 32 and subtracts the reference glidepath angle signal $\alpha$ therefrom to provide the glidepath angle difference signal $\theta_{diff.}$ desired. The glidepath angle error signal $\theta_{diff.}$ is then indicated on the indicator 36 in the aircraft when the switch 30 is closed.

The true slant-range distance signal from the buffer 16 is also fed into the multiplier 38 where it is multiplied with the glidepath angle error signal from the subtractor 34 to provide a signal representing the vertical deviation of the aircraft from the reference glidepath. The vertical deviation of the aircraft from the reference glidepath is then displayed on the indicator 40 in the aircraft.

Thus, on arrival of an aircraft at a predetermined letdown-initiation point on a reference glidepath defined by the reference altitude and the reference slant-range distance signals, the switch 30 is automatically closed to activate the aircraft guidance circuit 10 for visual indication of both angular deviation of the true aircraft glidepath from a reference aircraft glidepath and the vertical deviation of the true position of the aircraft from the glidepath.

Figure 3:
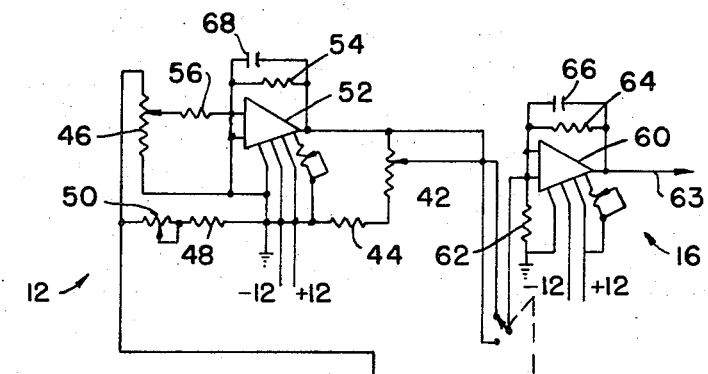
FIG. 3 is a schematic diagram of a portion of the means for producing the true slant-range distance signal and the true altitude signal and compensating these signals, illustrated in block form in FIG. 1.

A portion of the distance-measuring equipment interrogator 12 including the output potentiometer thereof and the circuit enabling offsetting of the associated distance-measuring equipment from the point O is shown in FIG. 3, along with a portion of the altimeter 14 including the precision pressure transducer and the modification thereto to permit compensating the altimeter for the elevation of point O and the barometric pressure, and the buffers 16 and 18 and the press-to-test switch 19.

As shown in FIG. 3, a positive one-volt is impressed across the external distance-measuring equipment interrogator, distance-takeoff potentiometer 42 through dropping resistor 44. This provides an output across potentiometer 42 of five millivolts per true slant-range mile from a distance-measuring equipment station where the potentiometer 42 of the distance-measuring equipment interrogator 12 represents two hundred miles from end to end. Alternately, the interrogator output potentiometer may be deleted and a voltage representation of slant-range distance applied directly to input operational amplifier 52. A positive 50 millivolts is impressed across the 10-turn precision potentiometer 46 through resistor 48 and rheostat 50.

The signal on the wiper arm of potentiometer 46 is fed to the inverting input of operational amplifier 52. The operational amplifier 52 provides 50-to-1 impedance buffering, sign inversion of the input signal and unity gain. The gain is determined by the ratio of the resistor 54 to the resistor 56.

The operational amplifier 52 is trimmed to provide 8 millivolts voltage drop between its output and ground. In operation, when potentiometer 46 is adjusted to provide a non-O input to the operational amplifier 52, a negative voltage appears between the output and ground of the operational amplifier of the same magnitude which produces a net cancellation of voltage between the wiper arm of potentiometer 42 and ground.

Thus, precision adjustment of potentiometer 46, as by means of a microdial, will permit accurate offsetting of the position of point O in FIG. 2; that is, of the slant-range distance from distance-measuring equipment by voltage cancellation. The microdial offsetting scale used in conjunction with the potentiometer 46 includes one revolution per mile of distance-measuring equipment station offset from the point O illustrated in FIG. 2 where the effect of offsetting is to effectively move the distance-measuring equipment station toward the aircraft.

The buffer 16 includes an operational amplifier 60 and provides 50-to-1 impedance buffering between the distance measuring equipment interrogator circuit 12 and the central processing circuit including the divider 32, subtractor 34 and multiplier 38 with a gain of approximately two hundred without signal inversion.

The non-inverted gain of the operational amplifier 60 is given by the ratio of resistor 62 plus resistor 64 to resistor 62. The capacitor 66 along with the capacitor 68 in the circuit 12 restricts the band-width of the operational amplifiers to approximately 1 kHz. Such limitation of the band-width of the amplifiers 52 and 60 increases the signal-to-noise ratio of the circuit 10.

The altimeter circuit 14 is self-contained and includes field elevation and barometric offset portions for compensating for the particular field elevation being approached and the particular barometric pressure at the time of approach to the particular field. Operation of the compensating circuits of the altimeter 14 is essentially the same as the operation of the offsetting circuit in the distance-measuring equipment interrogator considered above.

As shown in FIG. 3, the operational amplifier 70 is connected as a differential input amplifier in conjunction with 10-turn precision potentiometers 72 and 74. One volt is impressed across the barometric potentiometer 72, and 100 millivolts is impressed across the field elevation potentiometer 74. The potentiometers 72 and 74 are also equipped with microdials permitting independent offsetting of elevation above sea level and current barometric pressure. The microdial of-setting scale is 1 turn per 100 feet for potentiometer 74 and one-tenth of a turn per one-tenth of an inch of mercury for potentiometer 72.

A 50-millivolt output across potentiometer 76 to ground is provided for in circuit 14 with proper field elevation and current barometric pressure set by potentiometers 72 and 74. Again, the output of the potentiometer 76, which is a Giannini pressure transducer, is positive with respect to signal ground at any elevation above sea level under standard conditions, while the output of the operational amplifier 70 is negative.

The buffer 18 again includes an operational amplifier 78 connected essentially as the operational amplifier 60 in the buffer 16. The buffer 18 functions substantially the same as the buffer 16 and has a gain of twenty.

On actuation of the press-to-test switch 19, a 50-millivolt input is provided to operational amplifier 78 and an 8-millivolt input is provided to operational amplifier 60. This simulates the desired input to the circuit 10 for aircraft arrival at point O which could be touchdown for an on-course condition. This should provide a zero reading on indicators 36 and 40 at the worst case point of the aircraft guidance circuit operation.

The differential comparators 20 and 22, AND gate 26 and relay 28, together with the associated switches 24 and 30, form an automatic enabling circuit to permit the display of the desired glidepath angle error and vertical distance deviation from a reference glidepath on indicators 36 and 40 at aircraft letdown-initiation position. Alternately, a bi-angular approach may be preprogrammed for a steep-angle initial approach with automatic transition to a final shallower angle at a preselected altitude and slant-range distance.

Figure 4:
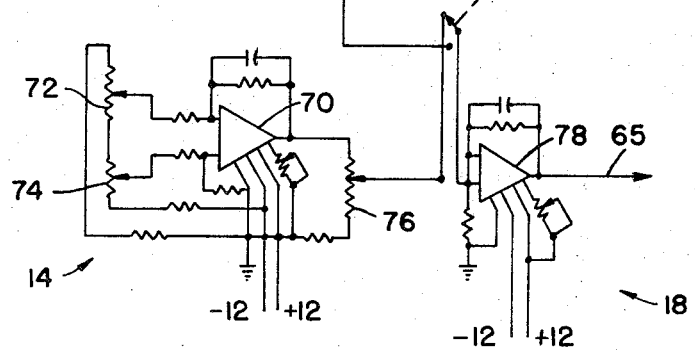
FIG. 4 is a schematic diagram of the automatic structure for indicating aircraft arrival at a letdown-initiation point, illustrated in block form in FIG. 1.
Figure 4:
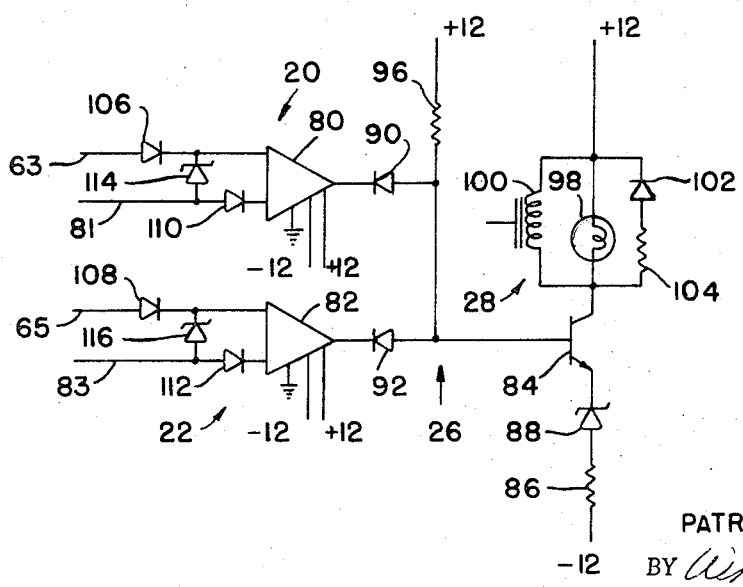

Appropriate voltages $\beta$ and $\rho$ representing a slant-range distance and an associated altitude, respectively, to provide a reference glidepath angle represented by voltage $\alpha$ may be selected with switch 24 and are applied to the integrated circuit differential comparators 80 and 82 illustrated in FIG. 4 over conductors 81 and 83, respectively.

When both the signals from the buffers 16 and 18 on conductors 63 and 65, that is, the true slant-range distance signal and the true altitude signal, become smaller than the selected reference slant-range distance signal $\beta$ and reference altitude signal $\rho$, the output voltages from the differential comparators 80 and 82 switch from −0.5 volts to +3.5 volts, and since the base of transistor 84 cannot rise above approximately three volts due to the voltage drop across the resistor 86, Zener diode 88 and the emitter base junction of transistor 84 with 40 milliamperes in the collector circuit, the diodes 90 and 92 become reverse biased.

On reverse biasing of both of the diodes 90 and 92, the logical AND circuit 26 formed by the diodes 90 and 92 and the resistance 96 switches logic levels to energize the transistor switch 84. Energizing of the transistor switch 84 provides current through lamp 98 to light lamp 98. At the same time, the reed relay coil 100 is energized to close the associated switch 30 and permit energizing the indicators 36 and 40. The combined events automatically signal a letdown initiation point visually within the aircraft.

The diode 102 and resistor 104 of the automatic enabling circuit illustrated in FIG. 4 absorb the voltage transient when the relay coil 100 is deenergized. The resistor 86 and Zener diode 88 connect the load associated therewith across the −12 and +12 volt power supplies instead of across the power supply voltage divider to circumvent upsetting voltage values due to a relatively large load in one segment of the voltage divider, as will be evident later on consideration of the particular power supply circuit.

The diodes 106 and 108 prevent the inputs of the differential comparators 80 and 82 from going negative in the event that the signal from the buffers 16 or 18 or both become negative with respect to ground. Diodes 110 and 112 at the reference voltage inputs to the comparators 80 and 82 compensate for the voltage offset introduced by the forward drop across diodes 106 and 108. These diodes, together with the 4.8-volt Zener diodes 114 and 116, limit the common mode voltage between the inverting and non-inverting inputs of comparators 80 and 82 to their absolute maximum value of 5 volts.

Figure 5:
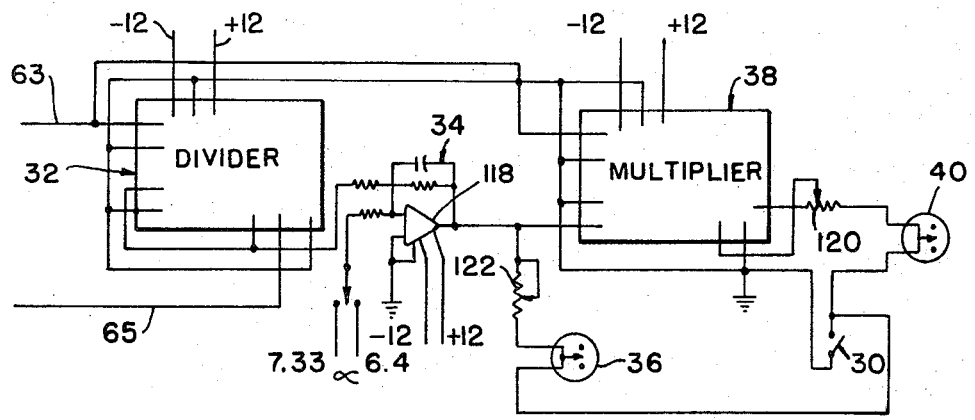
FIG. 5 is a partly schematic diagram of the dividing, subtracting and multiplying structure, illustrated in block form in FIG. 1.

The divider 32, subtractor 34 and multiplier 38 together provide a central processor for the aircraft guidance circuit of FIG. 1 in which the above referenced equations 1, 2 and 3 are implemented. The divider 32 and multiplier 38 are self-contained electronic analog devices which may be substantially the same with connections for division for the divider 32 and connections for multiplication for the multiplier 38. The subtractor 34 as shown better in FIG. 5 is an operational amplifier circuit and specifically includes the operational amplifier 118.

The divider 32, multiplier 38 and subtractor 34 are known purchased items and will not, therefore, be considered in detail herein. They have been selected and interconnected for maximum dynamic accuracy. The input and output impedance levels of the divider 32, subtractor 34 and multiplier 38 have been matched as nearly as possible in interconnecting these units and the range of input signal level variance and bandwidth were considerations in determining the interconnections of the divider 32, subtractor 34 and multiplier 38 as shown in FIG. 5.

In implementing the equations 1, 2 and 3 set forth above with the divider 32, subtractor 34 and multiplier 38, the ground-based, voltage-represented landing approach angle is specified when the voltage $\alpha$ is chosen with the corresponding voltages $\beta$ and $\rho$. Assuming a slant-range hypotenuse for the right triangle defined by voltages $\beta$ and $\rho$ of five miles and an altitude of 1,500 feet, an X signal level of +6.6 volts and a Y signal level of +4 volts, respectively, is indicated. The output of the divider then provides a $-\theta_{true} = -10Y/X = -6$ volts $= 3°$ and 19 minutes.

The value −6 volts corresponds to a desired aircraft position on an imaginary glide slope. As long as the aircraft altitude above ground level and the distance from zero point both correspond to a point on the desired glide slope, the output of the divider will be a constant −6 volts.

The −6 volt output of the divider is applied to the operational amplifier 118 of subtractor 34. Amplifier 118 provides impedance buffering, unity gain with inversion and summation of the selected reference angle $\theta = 6.15$ volts from the selected $\alpha$ input with the −6 volt input from the divider 32.

With the aircraft on the reference glide slope, the output from the operational amplifier 118 will be approximately zero. Therefore, the output of the multiplier will also be zero and the zero outputs will be displayed on the indicators 36 and 40 as an on-course or zero deviation condition.

If, however, the aircraft is above or below the glide slope, the output of the subtractor 34 will be non-zero. This voltage will correspond to the angle of departure of the aircraft above or below the reference glide slope. Multiplying the difference angle from the subtractor 34 with the slant-range distance from the buffer 16 will provide the actual deviation of the aircraft in feet above or below the glide slope from multiplier 38. This error signal is scaled at two-tenths of a volt per 100 feet and is displayed by means of the vertical scale indicator 40 calibrated to indicate plus or minus 100 feet above or below the glide slope.

Resistor 120 provides calibration for the meter 40. Resistor 122 provides 150 millivolts per six-tenths of a degree of angular deviation of a reference glide slope which is compatible with a standard glide slope indicator 36 such as the ID-101 glide slope indicator which is commercially available.

Figure 6:
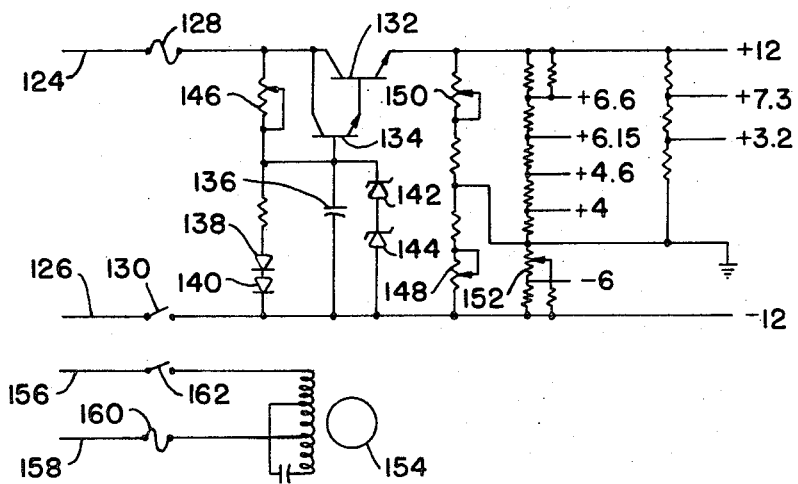
FIG. 6 is a schematic diagram of power supply structure for use with the aircraft guidance structure illustrated in FIG. 1.

The power supply circuit for the aircraft guidance circuit 10 as illustrated in FIG. 6 is an active-device capacitance-multiplier filter, Zener diode voltage regulator, and adjustable resistor voltage divider. The capacitance-multiplier provides noise suppression of a 27.5-volt direct current aircraft power input over conductors 124 and 126 through fuse 128 when switch 130 is closed.

A Darlington circuit is formed by transistors 132 and 134 which has a current gain of approximately 250, with capacitor 136 equal to 100 microfarads. This circuit provides an effective capacitance of 0.24 farad across the input terminals 124 and 126.

The diodes 138 and 140 provide temperature compensation for transistors 132 and 134. The Zener diodes 142 and 144 clamp the base of the transistor 134 at approximately 25.2 volts which can be adjusted slightly by varying the current through the diodes 142 and 144 by means of the rheostat 146.

A floating ground, common to the power supply and signals is used throughout the power supply of FIG. 6 and the aircraft guidance circuit 10. Most of the direct current power supplied to the circuit 10 is provided by the ± 12-volt supplies. The voltage dividers primarily furnish reference voltages for the $\beta$, $\rho$ and $\alpha$ signals at very small currents. Resistors 148, 150 and 152 permit compensation for voltage drops produced by the small currents supplied through the various taps of the voltage dividers.

Total power dissipation is approximately 5 watts or 210-milliamperes at 24 volts direct current. This requires forced ventilation for the enclosure of the aircraft guidance circuit and power supply to limit thermal rise and stabilize performance. Ventilation is provided by a 115-volt 100 Hz induction motor axial flow fan 154 having an input filter fed from the aircraft system over conductors 156 and 158 through fuse 160 when switch 162 is closed.

Thus, it is seen that there is disclosed an all-electronic solid-state aircraft guidance circuit which is reasonably minimized for economical, optimum performance and repeatable accuracy in implementation of required flight equations. As indicated, the aircraft guidance circuit 10 is believed to have particular use in establishing a steep descent angle of, for example, 6° of glidepath for use in conjunction with a conventional 2° instrument landing system glidepath for aircraft noise-abatement purposes. The aircraft guidance circuit 10 is, however, not so limited and may be used to provide a glidepath of lesser degree to touchdown. The circuit of the invention also has the capability of use in directing aircraft to a preselected altitude as well as in directing the aircraft down from a predetermined altitude.

Figure 7:
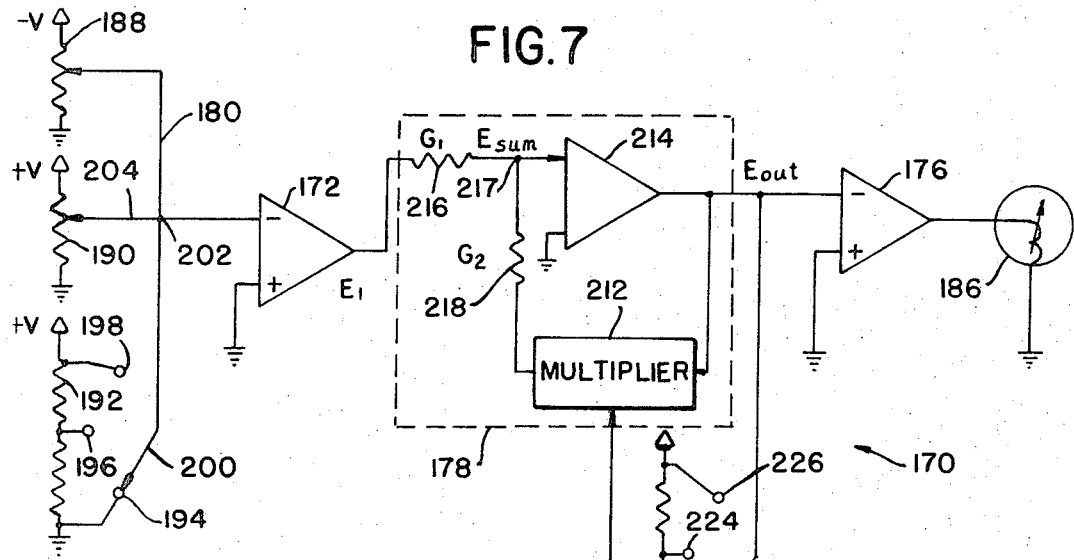
FIG. 7 is a partly block, partly schematic diagram of simplified aircraft guidance structure for providing a display of glidepath angle error in accordance with the method of the invention.

The simplified aircraft guidance system 170 of FIG. 7 includes three operational amplifiers 172, 174 and 176 and the divider 178. An altitude input circuit 180 provides the input to operational amplifier 172, while a distance-measuring equipment slant-range input circuit 182 provides the input signal for the operational amplifier 174. The inputs to the divider 178 are signals representing the true altitude and true slant-range distance to an aircraft so that the output from the divider 178 is the true angle of the aircraft from a touchdown point or other selected point. Inputs to the operational amplifier 176 are a selected reference glidepath angle signal and a true glidepath angle signal. The output of the operational amplifier 176 after subtraction of the inputs thereto from the angle selection circuit 184 and divider 178 is the error angle of the aircraft glidepath which is presented on the controlled descent indicator 186.

Referring more specifically to the altitude input circuit 180, three separate potentiometers 188, which may be the output potentiometer of an electric altimeter provided with a precision pressure transducer such as the potentiometer 76 previously considered, nulling potentiometer 190 which is connected through a source of bias voltage to ground and altitude reference potentiometer 192 which is again connected between a source of bias voltage and ground. The altitude reference potentiometer 192 has selected taps 194, 196 and 198 thereon and the bias voltage therein is chosen to provide a voltage at tap 194 representing a zero altitude. Taps 196 and 198 provide an electrical signal representing 1,000-ft. altitude and 2,000-ft. altitude above ground level signals, respectively.

In providing an altitude input signal to the differential amplifier 172 as the aircraft crosses one of the check altitudes, for example, 1,000 or 2,000 feet, the contact arm 200 is moved to the corresponding tap on the potentiometer 192 to provide a positive voltage at the point 202 representing the altitude of the aircraft as indicated on the aircraft altimeter. This signal is of opposite polarity to the signal from the potentiometer 188. The output at the point 202 into the amplifier 172 is nulled to 0 at this time by means of moving the contact arm 204 on the potentiometer 190. The reference signal from the potentiometer 192 is then removed by moving the contact arm 200 out of engagement with the contacts 196 and 198. The signal from the potentiometer 188 of the electric altimeter is then synchronized with the aircraft altimeter so that on aircraft touchdown the altitude input signal to the operational amplifier 172 should be zero. An altimeter null signal at touchdown, which was difficult to obtain with the structure of FIG. 3, is thus easily accomplished with the simplified structure of FIG. 7.

Similarly, in the circuit 182 a signal from potentiometer 206 which may, for example, be the takeoff potentiometer 42 from distance-measuring equipment such as the distance-measuring equipment considered above is varied by the signal across the distance-measuring equipment offset potentiometer 208 to provide distance-measuring equipment offset along the aircraft glidepath on movement of the arm 210 of the potentiometer 208. Such electrical offsetting is similar to raising the altitude of the distance-measuring equipment on offsetting the distance-measuring equipment electrical output signal to indicate movement of the equipment toward the aircraft and will be equivalent to lowering the distance-measuring equipment altitude on offsetting the distance-measuring equipment signal corresponding to a movement of the distance-measuring equipment away from the aircraft.

The operational amplifiers 172 and 174 provide offsetting, scaling and buffering of the altitude and slant distance signal inputs to the divider 178.

The divider 178 is essentially an analog multiplier 212 connected in the implicit division mode with the operational amplifier 214 as shown. Thus, with the altitude output from the amplifier 172 designated $E_1$ and the slant-range output signal from amplifier 174 designated $E_2$, the value of the resistor 216 in the divider input circuit from the operational amplifier 172 designated $G_1$, and the resistor in the output from the multiplier 212 to the amplifier 218 designated $G_2$, the signal at point 217 designated $E_{sum}$ and the output from the divider being designated as $E_{out}$ and with the ratio of the resistors 216 and 218 being 10-to-1, the following relationships are obtained wherein K has dimensions of 1/volts:

$$E_{sum} = E_{out}/A \approx 0 \quad (4)$$
$$E_{sum} = E_1 G_1 - KG_2 E_{out} E_2 = 0 \quad (5)$$
$$E_{out} = G_1 E_1/KG_2 E_2 = -10 E_1/E_2 \quad (6)$$

The divider thus effectively divides the properly offset, scaled and buffered altitude information from the operational amplifier 172 by the slant-range distance information for operational amplifier 174 to provide an output which is $\theta_{true}$ referring to the diagram of FIG. 2. A $\theta_{ref.}$ output is provided from the reference angle circuit 184 on moving the contact arm 220 between the contacts 222, 224 and 226. The $\Theta_{diff.}$ angle which is displayed on the controlled descent indicator 186 in the aircraft is thus produced by the operational amplifier 176 which connected as i-lustrated performs illustrated subtraction function as before.

The simplified aircraft guidance system illustrated in FIG. 7 is economical, efficient and highly reliable when the aircraft approaches the distance-measuring equipment station directly. Generally, with such systems in use, the heading to the distance-measuring equipment station will be known. If it is desired to eliminate errors which might produce a fly-up indication on the controlled descent indicator 186 due to flight of the aircraft substantially tangential to a distance-measuring equipment station on close approach of the aircraft to the station on an approach heading bringing the aircraft to either side of the distance-measuring equipment station whereby the slant-range would stay the same as the aircraft approached the distance-measuring equipment station while the altitude decreased, the more sophisticated aircraft guidance system illustrated in block form in FIG. 8 and described below in conjunction with the diagram of FIG. 9 may be provided.

Figure 9:
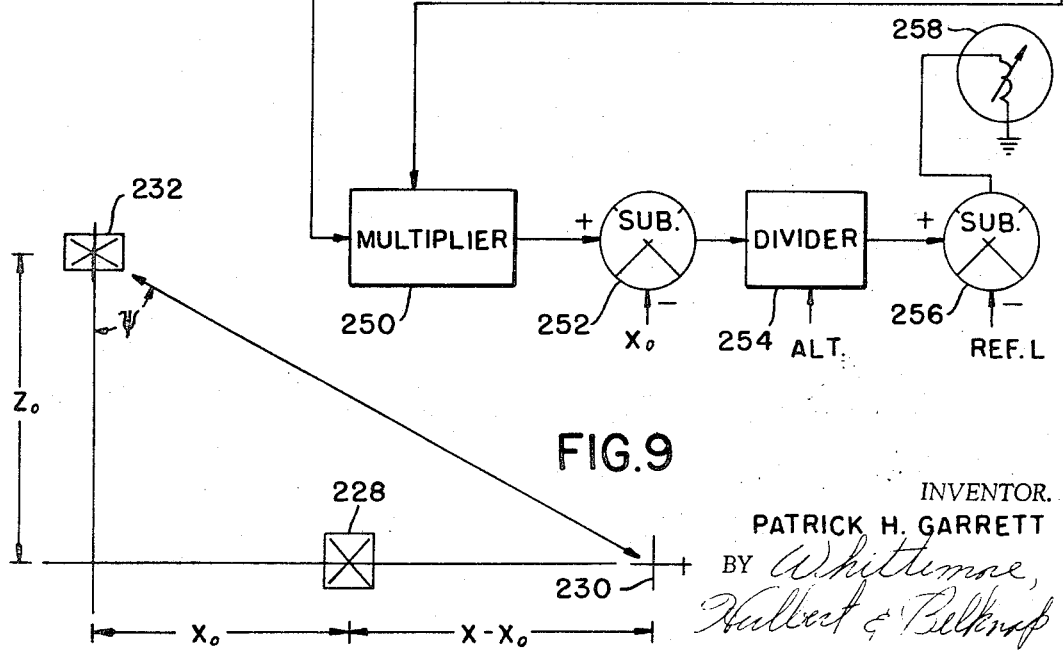
FIG. 9 is a diagram useful in explaining the structure illustrated in FIG. 8.

In the diagram of FIG. 9 it is desired to offset the distance-measuring equipment station from the position 228 both in line with the glidepath of the aircraft 230 and at right angles thereto to the position 232. An offset vertical guidance system then requires the implementation of the following equations:

$$X = \text{(slant-range)} (\sin \psi)$$
$$= \text{(slant-range)} (\sqrt{1 - \cos^2 \psi})$$
$$= \text{(slant-range)} (\sqrt{1 - Z_o^2/\text{slant-range}^2}) \quad (7)$$
$$\theta_{true} = \text{altitude}/X - X_o \quad (8)$$
$$\theta_{diff} = \theta_{true} - \theta_{ref} \quad (9)$$

Figure 8:
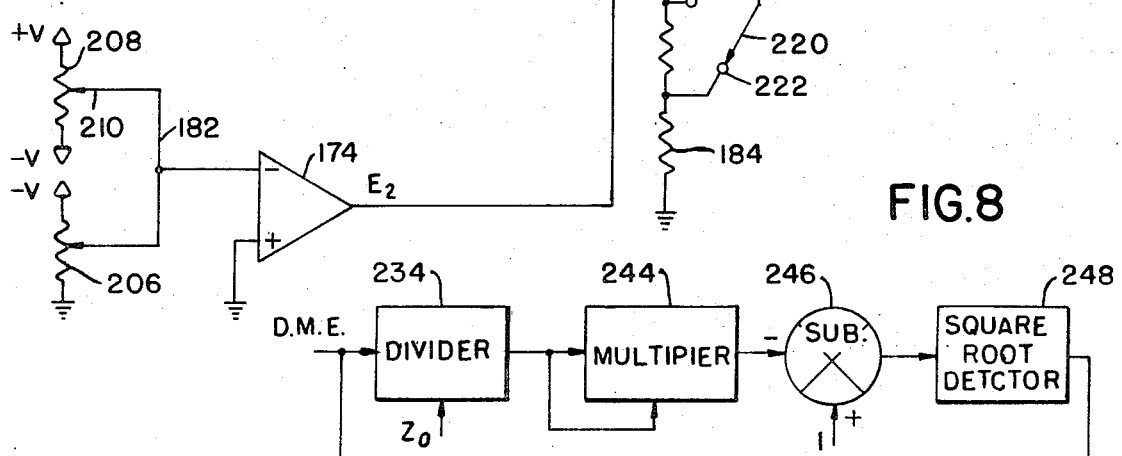
FIG. 8 is a block diagram of structure for compensating the aircraft guidance structure of the invention for distance-measuring equipment offsetting constructed in accordance with the invention.

As shown in FIG. 8, in implementing the equations 7 through 9, an aircraft slant-range signal from distance-measuring equipment such as previously considered is fed to a divider 234 where it is divided into the $Z_o$ offset distance to provide a signal representing the co-sine of the angle $\psi$. The co-sine of $\psi$ signal from the divider 234 is squared in the multiplier 244 to provide an output providing the co-sine squared of the angle $\psi$, which signal is subtracted from a reference signal equal to 1 in the subtractor 246 to provide an output signal equal to 1 minus the co-sine squared of the angle $\psi$ to the square root detector 248. The output from the square root detector 248 will in accordance with normal algebraic manipulation of trigonometric functions be a signal equal to the sine of the angle $\psi$. The sine of the angle $\psi$ is then multiplied by the slant-range distance signal in the multiplier 250 to provide an output signal which is very closely equal to the distance X of the aircraft from the distance-measuring equipment station in its offset position 232 along the glidepath of the aircraft. This signal is then subtracted from a signal representing the offset distance $X_o$ to provide a distance signal which is substantially X minus $X_o$ in the diagram of FIG. 9 which is then divided into an altitude signal which may be obtained from an operational amplifier such as 172 in FIG. 7 in the divider 254 to provide a true glidepath angle signal for comparison with a reference glidepath angle signal in the subtractor 256 to again provide the glidepath angle error signal on the controlled descent indicator 258 as before.

It is thus possible to provide aircraft guidance for a plurality of separate runways with one distance-measuring equipment station at an airport with particularly low allowable performance minimums. It will be understood that if the more sophisticated system of FIG. 8 is not desired, the system of FIG. 7 may be used at specified usable minimums to generate aircraft vertical glidepath information sufficient for use under most conditions. Further, it will be pointed out that the aircraft guidance system of FIG. 7 may provide information useful in locating new distance-measuring equipment stations at airfields.

While embodiments and modifications of the invention have been considered in detail, it will be understood that other embodiments and modifications thereof are contemplated by the inventor. It is the intention to include all such embodiments and modifications which are defined by the appended claims within the scope of the invention.

What I claim as my invention is:

1. Aircraft vertical guidance structure comprising means for providing a signal representing the slant-range distance of an aircraft from a reference point, barometric means for providing a signal representing the altitude of the aircraft from the reference point, means for directly dividing the distance signal into the altitude signal to provide a true glidepath angle signal, means for supplying a reference glidepath angle signal, means for subtracting the reference glidepath angle signal from the true glidepath angle signal to provide a glidepath angle error signal, and means for multiplying the glidepath angle error signal by the slant-range distance signal to provide a distance deviation from a predetermined glidepath error signal and means for displaying at least one of the glidepath angle error signal and the distance deviation error signal.

2. Structure as set forth in claim 1 and further including means operably connected to the means for providing a signal representing the slant-range distance, the means for providing an altitude signal and to the indicating means for providing an automatic indication of aircraft arrival at a letdown-initiation point visually and for automatically actuating the indicating means on arrival of the aircraft at the letdown-initiation point.

3. Structure as set forth in claim 1 and further including means operably associated with the slant-range distance signal providing means for compensating the distance signal to permit variable placement of ground based equipment in mutually perpendicular directions for producing the distance signal.

4. Structure as set forth in claim 1 and further including means operably associated with the altitude signal providing means for compensating the altitude signal for barometric pressure changes and the altitude of the reference point.

5. The method of determining vertical angle deviation from a reference glidepath angle comprising producing a signal representing the slant-range distance of an aircraft from a predetermined point, producing a signal representing the altitude of the aircraft from the predetermined point, directly dividing the altitude signal by the distance signal to provide a true glidepath angle signal, providing a reference glidepath angle signal, subtracting the reference glidepath angle signal from the true glidepath angle signal to provide a glidepath angle error signal, multiplying the glidepath angle error signal by the slant-range distance signal to provide a vertical distance error signal and displaying at least one of the glidepath angle error signal and the vertical distance error signal.

6. The method as set forth in claim 5 and further including automatically indicating the arrival of the aircraft at a letdown-initiation point.

7. The method as set forth in claim 5 and further including compensating the slant-range distance signal for offsetting distance measuring equipment in mutually perpendicular directions from the predetermined point.

8. The method as set forth in claim 5 and further including compensating the altitude signal for barometric pressure change and the altitude of the predetermined point.

9. Aircraft vertical guidance structure comprising means for providing a signal representing the slant-range distance of an aircraft from a reference point, means operably associated with the slant-range distance signal providing means for compensating the distance signal to permit variable placement of ground based equipment in mutually perpendicular directions for producing the distance signal, means for providing a signal representing the altitude of the aircraft from the reference point including means for compensating the altitude signal for barometric pressure changes and the altitude of the reference point, means for directly dividing the distance signal into the altitude signal to provide a true glidepath angle signal, means for supplying a reference glidepath angle signal and means for subtracting the reference glidepath angle signal from the true glidepath angle signal to provide a glidepath angle error signal and means for displaying the glidepath angle error signal.

10. The method of determining vertical angle deviation from a reference glidepath angle comprising producing a signal representing the slant-range distance of an aircraft from a predetermined point, producing a signal representing the altitude of the aircraft from the predetermined point, compensating the altitude signal for barometric pressure changes and the altitude of the predetermined point, directly dividing the altitude signal by the distance signal to provide a true glidepath angle signal, providing a reference glidepath angle signal and subtracting the reference glidepath angle signal from the true glidepath angle signal to provide a glidepath angle error signal and indicating the glidepath angle error.

11. Structure for providing an aircraft vertical glidepath angle error signal using an altitude signal and a slant-range signal from distance-measuring equipment offset along the glidepath and perpendicular thereto on the ground comprising means for dividing the slant-range distance from the offset, offset distance-measuring equipment position to the aircraft by the offset distance of the distance-measuring equipment perpendicular to the aircraft glidepath to provide a signal representative of the co-sine of the angle between the slant-range distance and the perpendicular offset distance, means for multiplying the co-sine signal by itself to provide an output co-sine square signal, means for subtracting the co-sine square signal from a signal having a 1-value to provide a signal representing 1 minus the co-sine squared signal, means for taking the square root of the 1 minus the co-sine squared signal to provide a signal representing the sine of the angle, means for multiplying the signal representing the sine of the angle with the slant-range distance signal to provide an output signal substantially representing the distance between the aircraft and the offset, offset distance-measuring equipment on the glidepath of the aircraft, means for subtracting a signal representing the offset distance of the distance-measuring equipment along the glidepath from the signal substantially representing the distance between the aircraft and the offset, offset position of the distance-measuring equipment on the glidepath of the aircraft to provide a signal substantially equal to the distance between the aircraft and the original position of the distance-measuring equipment on the aircraft glidepath, means for dividing the last-mentioned signal by the altitude of the aircraft to provide a true aircraft glidepath angle signal, means for subtracting a reference aircraft glidepath angle signal from the true aircraft glidepath angle signal to provide an aircraft glidepath error signal and means for displaying the aircraft glidepath error signal all connected in series.

12. Structure as set forth in claim 11 and further including means for multiplying the glidepath angle error signal by the slant-range distance signal to provide a distance deviation from a predetermined glidepath error signal and means for displaying the distance deviation error signal.

13. Structure as set forth in claim 11 and further including means operably connected to the means for providing a signal representing the slant-range distance, the means for providing an altitude signal and to the indicating means for providing an automatic indication of aircraft arrival at a letdown-initiation point visually and for automatically actuating the indicating means on arrival of the aircraft at the letdown-initiation point.

14. Structure as set forth in claim 11 and further including means operably associated with the altitude signal providing means for compensating the altitude signal for barometric pressure changes and the altitude of the reference point.

* * * * *